United States Patent [19]

Korenowski et al.

[11] 4,008,162
[45] Feb. 15, 1977

[54] WASTE TREATMENT OF FLUOROBORATE SOLUTIONS

[75] Inventors: Theodore Frank Korenowski; Jerry Lee Penland, both of Zelienople; Chalmer John Ritzert, Butler, all of Pa.

[73] Assignee: Dart Industries Inc., Los Angeles, Calif.

[22] Filed: Aug. 5, 1975

[21] Appl. No.: 602,180

[52] U.S. Cl. .................................. 210/45; 210/51; 210/53; 210/56; 204/149; 134/13
[51] Int. Cl.[2] .......................................... C02B 1/20
[58] Field of Search .................. 210/42, 45, 47, 49, 210/50, 51, 52, 53, 59, 60, 61; 156/19; 252/79.3; 204/130, 149; 423/293, 158, 159, 464, 489, 490; 134/13

[56] References Cited

UNITED STATES PATENTS

| 3,284,350 | 11/1966 | Williamson | 210/45 |
|---|---|---|---|
| 3,800,024 | 3/1974 | Forsell et al. | 210/45 |
| 3,933,605 | 1/1976 | Butler et al. | 204/149 |
| 3,959,132 | 5/1976 | Singh | 210/45 |

FOREIGN PATENTS OR APPLICATIONS 1,136,456  12/1968  United Kingdom

OTHER PUBLICATIONS

Chem. Abst., vol. 84:80346q, "Kinetics and Mechanism of Hydrolysis Reactions of Some Fluorine Acid Complexes in the Presence of Polarizing Cations," (1975).

*Primary Examiner*—Frank A. Spear, Jr.
*Assistant Examiner*—Benoit Castel
*Attorney, Agent, or Firm*—Margareta LeMaire; Bryant W. Brennan; Fred S. Valles

[57] ABSTRACT

A two-step process for the waste treatment of fluoroborate solutions which involves hydrolysis at an acidic pH in the presence of calcium ions to liberate fluoride and subsequent removal of fluoride values, e.g. by precipitation as calcium fluoride under alkaline conditions.

10 Claims, 7 Drawing Figures

EFFECT OF CALCIUM CONCENTRATION ON HYDROLYSIS RATE OF $BF_4^-$ pH EFFECT ON HYDROLYSIS OF $BF_4^-$

TEMPERATURE EFFECTS ON HYDROLYSIS OF $BF_4^-$

TIME REQUIRED FOR COMPLETE $BF_4^-$ HYDROLYSIS AT VARIOUS ACIDIC pH CONDITIONS

WASTE TREATMENT OF FLUOROBORATE SOLUTIONS

BACKGROUND OF THE INVENTION

Plating solutions, and the like, containing metal fluoroborates and fluoroboric acid now enjoy a great deal of popularity in the metal finishing industry. Indeed, in some cases, such as printed circuit manufacture, no viable substitutes for the fluoroborate plating baths are currently available. However, at this time, no effective system is known for waste treatment of spent baths and rinse waters containing fluoroborate. Most current treatment systems for this species function on a simple neutralization followed by discharge. This type of treatment seldom, if ever, accomplishes more than a conversion of the fluoroborate ion to a hydrated boron trifluoride or hydroxyfluoroborate anions. These species when discharged are then free to slowly hydrolyze and release toxic fluoride ion into the environment as hydrofluoric acid.

Indeed, previous work (Tomio Onishi, Bulletin of the Chemical Society of Japan, Vol. 42, No. 1, pp. 127–131, 1969) indicates that fluoroborate discharged into streams, rivers, and ocean waters may require more than a year to undergo complete hydrolysis. Additionally, it is reported in the same study, that conditions of elevated pH and temperature can reduce the time required for complete decomposition of the fluoroborate species to a period of 20 to 30 hours. However, a treatment retention time of this magnitude for fluoroborate hydrolysis is extremely impractical for most operations.

It is therefore an object of the present invention to provide a new and improved process for the hydrolysis of fluoroborate ions.

It is another object of the present invention to provide a process for effectively removing fluoride values from solutions containing fluoroborate compounds.

It is still another object of the invention to provide a process for treatment of spent fluoroborate processing solutions from a metal finishing operation.

A further object is to provide a process for the pollution free disposal of effluents from a metal finishing operation employing fluoroborate solutions.

These and other objects of the present invention will become apparent to those skilled in the art from the detailed description and illustrated embodiments thereof.

THE INVENTION

Figure 1:
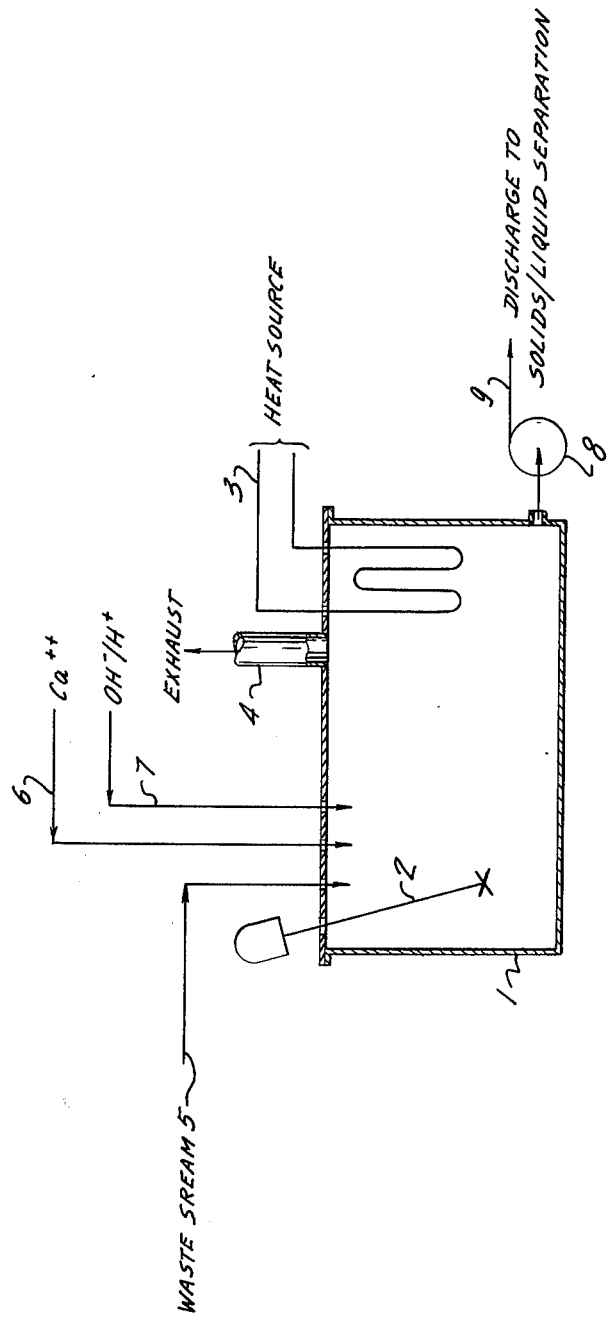
FIGS. 1–3 are schematic flow diagrams depicting respectively batch flow-through and integrated treatments of waste solutions containing fluoroborate compounds.

The present invention relates to a novel process which greatly reduces the time required for hydrolysis of the fluoroborate ion and other species intermediate in total hydrolysis of fluoroborate compounds like hydrated boron trifluoride and hydroxy fluoroborate anions. For the purpose of this application the term "fluoroborate" is meant also to include any such intermediary compounds and anions. It has been discovered that if solutions containing fluoroborate are heated at an acid pH in the presence of calcium ions, then a more rapid hydrolysis of the fluoroborate is achieved than with any other prior art method. In fact, it is possible to substantially completely hydrolyze the fluoroborate in one hour or less.

The liberated fluoride, hydrofluoric acid and calcium fluoride formed in this reaction can then be treated by any number of techniques known in the art for removal of fluoride values from solution. For the purpose of this application the term "fluoride values" is intended to include the aforementioned liberated fluoride, hydrofluoric acid and calcium fluoride. One such applicable method involves neutralization of the solution with an alkaline compound and precipitation of fluoride as calcium fluoride under alkaline conditions. Although hereinafter only this approach of removing fluoride values from solution will be discussed it should not be construed as a restriction of the scope of the invention. Thus, a treatment system for hydrolysis of fluoroborate, with subsequent neutralization and fluoride removal, can be described by the following two equations:

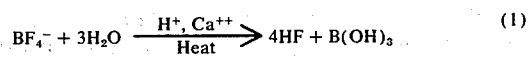
$$BF_4^- + 3H_2O \xrightarrow[\text{Heat}]{H^+, Ca^{++}} 4HF + B(OH)_3 \qquad (1)$$

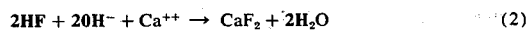
$$2HF + 2OH^- + Ca^{++} \rightarrow CaF_2 + 2H_2O \qquad (2)$$

There are three main variables affecting the fluoroborate hydrolysis reaction rate (1): namely calcium ion concentration, temperature and pH.

The calcium ion concentration is expressed hereinafter in terms of a multiple of the potential molar fluoride values (PMFV) of the solutions assuming complete hydrolysis. Referring to equations (1) and (2) it is seen that a stoichiometric amount of calcium ions is 0.5 times the potential molar fluoride value depicted in reaction (1) as HF. It should be understood that in case the fluoroborate solution to be treated also contains "free" fluorides, such as hydrofluoric acid or fluoride ions, determination of PMFV would also take into account the concentration of such fluorides. It was found that performing the hydrolysis reaction in the presence of calcium ions, even in very small concentrations, greatly enhances the hydrolysis rate, for instance provisions of calcium ions at a concentration of only 0.25 PMFV causes an increase in the hydrolysis rate of about 55 percent as compared to a reaction carried out under identical conditions but in the absence of calcium ions. It is therefore believed that provisions of calcium ion in any concentration is helpful in accelerating the hydrolysis reaction. For optimum enhancement, i.e. to achieve substantially complete hydrolysis in very short times, it is preferred that the amount of calcium ion concentration provided be at least about 0.5 PMFV or higher. There is no critical upper limit for the calcium ion concentration, however for practical purposes the concentration usually need not exceed a value of about 1.5 PMFV. A variety of calcium compounds may be used as the source of the calcium ions, such as calcium hydroxide, calcium oxide, calcium chloride and the like. The only limitation as to the nature of the calcium compound is that it should display sufficient solubility under acid conditions so as to provide "free" calcium ions to aid in the breakdown of the fluoroborate.

The hydrolysis reaction may also be operated in such a fashion that a predetermined "excess" of calcium ions is maintained in solution by manual or automated monitoring and addition means. In practice, this would reduce to maintenance of a calcium ion concentration above that accounted for by the solubility of calcium fluoride under the hydrolysis conditions prevailing in the system. In this manner it is assured that at least the stoichiometric amount of calcium ions is provided, which is necessary for the complete potential precipitation of the fluoroborate loading. As an example, in a system where conditions affecting calcium fluoride solubility as well as fluoroborate loading are relatively constant, an excess of a few milligrams of calcium ions per liter of solution would be sufficient. In other circumstances, where conditions affecting the solubility of calcium fluoride are subject to fluctuations and/or where shock loading may occur, it is preferred to maintain a much larger excess of calcium ions.

The hydrolysis reaction should be carried out under acid conditions. It was found that even at very slightly acidic conditions, e.g. at a pH of 6.2, the hydrolysis rate was significantly improved as compared to the rates obtained at slightly alkaline conditions. The preferred conditions for the hydrolysis reaction is at a pH of about 4.0 or less and most preferably in the pH range from about 1.0 to about 3.0. Operation in this latter range will result in substantially complete hydrolysis within a very short time such as one hour or less. If needed, the pH is adjusted during the reaction by addition of a suitable metal hydroxide, oxide or carbonate, e.g. calcium hydroxide, to raise the pH, or by the addition of an appropriate mineral acid, such as hydrochloric, nitric, sulfuric acid and the like to lower the pH. A preferred treatment technique would be to add sufficient quantities of hydrochloric acid and calcium hydroxide to maintain the desired pH and to provide the calcium ions necessary to promote the hydrolysis of the fluoroborate species. As the calcium ion combines with the hydrofluoric acid released from fluoroborate, new calcium ion provided as calcium chloride according to reaction (3):

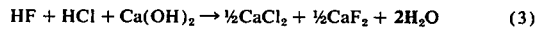

$$HF + HCl + Ca(OH)_2 \rightarrow \tfrac{1}{2}CaCl_2 + \tfrac{1}{2}CaF_2 + 2H_2O \qquad (3)$$

For any particular system, the required amounts of hydrochloric acid and calcium hydroxide can easily be determined by a person with ordinary skills in the art.

The reaction should be carried out at elevated temperatures. It was found that at temperatures above room temperature the hydrolysis rate was significantly improved, for instance the percent hydrolysis after 4 hours was about doubled at 130° F and tripled at 160° F. The preferred temperature range is from about 160° F to about the boiling point of the reaction mixture, with the range of from about 180° F to about 200° F being the most preferred since substantially complete hydrolysis can be achieved in this temperature range in less than 1 hour's time.

Experimental results have shown that a substantially complete fluoroborate hydrolysis is accomplished in 1 hour or less when the aforementioned preferred operating conditions are maintained. However, it is anticipated that some redundancy would be provided in a commercial system; therefore, a retention time in the range of about one to two hours or even higher would be employed in such a system.

Regardless of what system is used, the treatment solution should be property agitated to insure intimate contact of participant reactants in the hydrolysis reaction. Also, since some amount of liberated hydrofluoric acid can be volatilized at the elevated temperature, the reaction should be carried out in a closed vessel, which is suitably vented to a fume scrubbing device or to the vessel, in which reaction (2) is being conducted.

After hydrolysis, the removal of the fluoride values from the reaction solution in accordance with reaction (2) involves neutralization of freed acid and precipitation of fluoride at alkaline conditions. This can be accomplished by timely addition of a metal hydroxide, oxide or carbonate. Suitable metal hydroxides, oxides or carbonates include those selected from alkali or alkaline earth metal hydroxides, oxides or carbonates. Of the latter, calcium hydroxide or oxide is the most preferred. In case the hydrolysis reaction is carried out in the presence of less than stoichiometric amounts of calcium ions, a calcium compound such as the chloride; oxide, hydroxide, carbonate etc. should be added in amounts at least sufficient to provide for the stoichiometric amount required for complete precipitation of all potential fluoride produced by the hydrolysis. It is also preferred to maintain the pH during this reaction step in the range from about 8.0 to 11.0. The reaction proceeds well at ambient temperatures; therefore, a reaction retention time of about 10 to 20 minutes is usually adequate under conditions of proper agitation to provide intimate contact of reactants. The precipitated calcium fluoride is subsequently removed from the reaction mixture by any solidsliquid separation technique known in the art.

The process of this invention can be used to treat spent fluoroborate process solutions and rinse waters associated with such processing. Additionally, this system may receive and treat the effluent from other processes wherein metal fluoroborate solutions are subjected to treatment for removal and for recovery of contained metals such as tin and lead fluoroborate. Systems receiving effluents from a variety of sources can be envisioned to function on a batch, flow-through, or integrated treatment basis.

The final liquid effluent from the process may be safely disposed of without causing any of the pollution problems previously associated with waste streams from operations employing fluoroborate solutions. Also, disposal of calcium fluoride is not a problem. If desired, the calcium fluoride may be used as a starting material for various reactions, such as in the production of hydrofluoric acid or as a flux in metal refining.

Reference is now had to FIG. 1, which depicts a typical batch operation of the process of the invention. Into a closed reactor vessel 1 equipped with means for agitation 2, a heat source 3 and an exhaust 4 is introduced a desired quantity of the waste stream 5 of known dissolved fluoroborate concentration. An appropriate quantity of calcium ions are added in line 6 and, if necessary, an acid or a base is introduced in line 7 to maintain the pH in the desired acid range. The reaction is allowed to proceed at elevated temperatures and under agitation. Vapors leaving the reaction vessel through exhaust 4 are suitably scrubbed in a scrubber (not shown) to remove volatilized hydrofluoric acid liberated in the reaction. After the hydrolysis reaction is completed, heating is discontinued and the pH is adjusted to a value in the alkaline range by introduction of a base through line 7 and optionally by addition of further calcium oxide or hydroxide through line 6. Calcium fluoride is thereby precipitated, which after the end of the reaction is removed as a slurry by means of pump 8 and line 9 to a solids/liquid separation zone not shown on the drawing.

Figure 2:
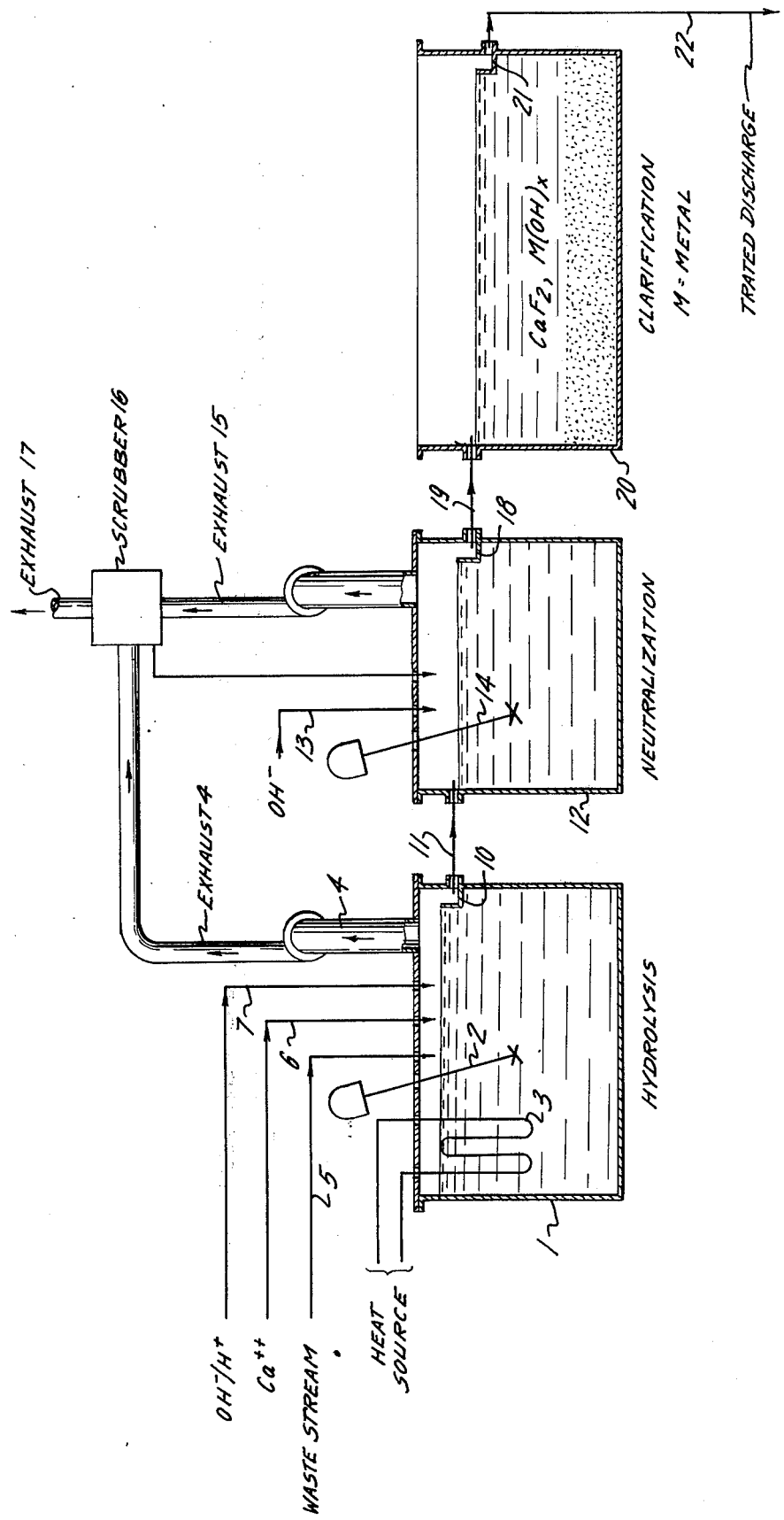

FIG. 2 shows another embodiment of the process of the invention, which is carried out under continuous flow through conditions. The hydrolysis reaction is carried out in very much the same way as in the batch operation illustrated in FIG. 1, except that the waste stream introduction and the calcium ion addition to reactor 1 is on a continuous basis. The reaction is also equipped with overflow means 10, which enables the effluent 11 from the hydrolysis reactor 1 to flow directly into closed neutralization reactor 12. Hydrolysis reactor 1 is sized to provide the proper average residence time of the reaction mixture therein. For the neutralization reaction a suitable base is continuously added in line 13 to provide the alkaline conditions necessary for the precipitation of calcium fluoride. The reactor content is agitated by agitator means 14 therefor. The exhaust 15 from reactor 12 and exhaust 4 from reactor 1 are scrubbed in scrubber 16 to remove any volatilized hydrofluoric acid and then released to the atmosphere in line 17. The agitated slurry in reactor 12 is removed through overflow means 18 and line 19 into clarification tank 20 where precipitated calcium fluoride is allowed to settle. In a case where the waste stream 1 is a solution containing a metal fluoroborate, the precipitate in clarification vessel 12 will also contain a certain amount of the corresponding metal hydroxide. The supernatant liquid is withdrawn through overflow means and discharged by means of conduit 22.

Figure 3:
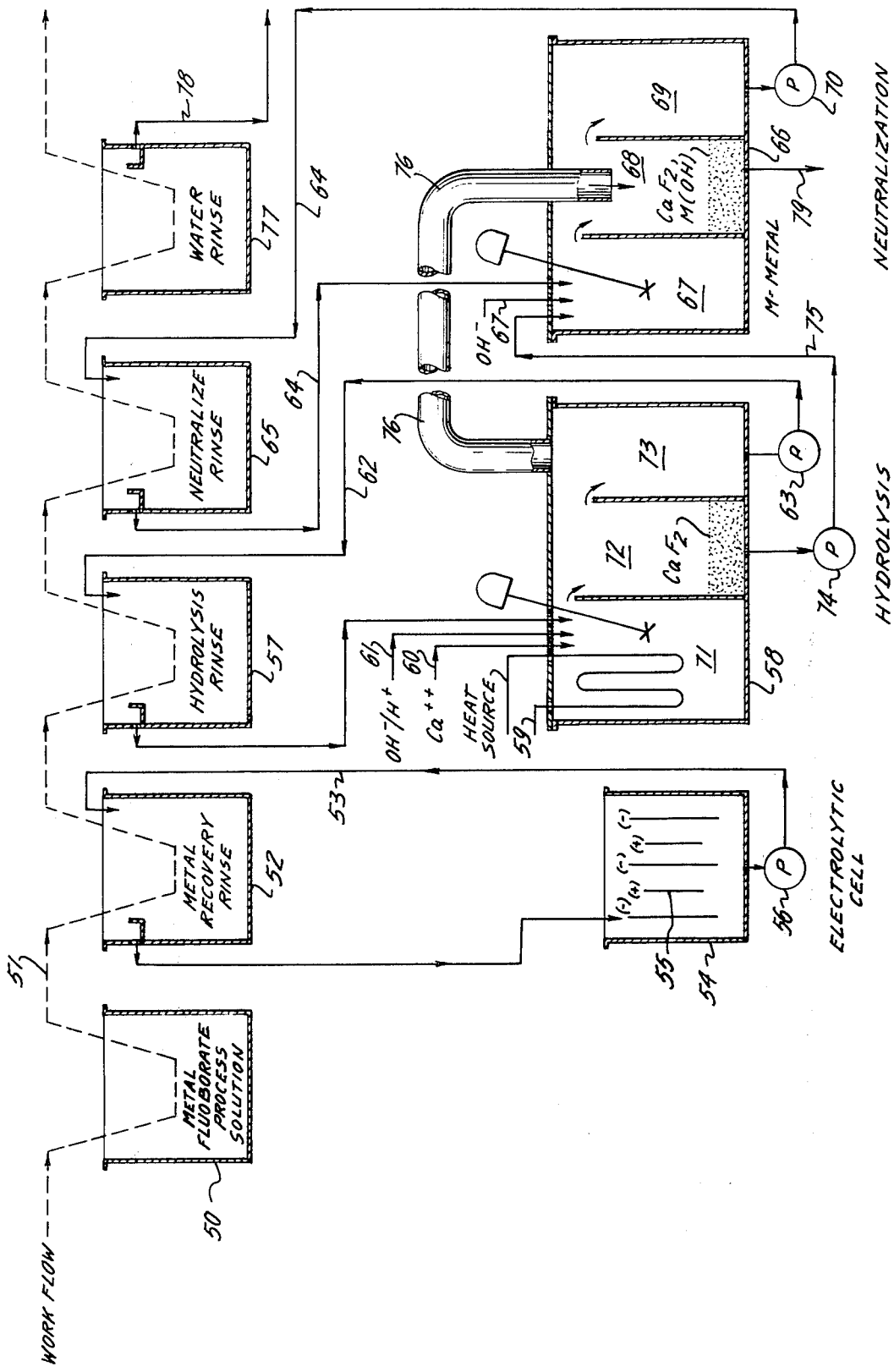

FIG. 3 shows the use of this invention as integrated into a finishing scheme. In this method, workpieces flow through a series of separate closed-loop recirculated rinses, and solution transfer from one sequential loop to another occurs through dragout on the workpieces. The present invention is applied to this type of treatment as a hydrolysis rinse followed by a neutralization rinse. These reactions do not necessarily occur at the rinse station, but are usually performed in a remote vessel where conditions are maintained to achieve the desired reaction. After appropriate retention and treatment, the effluents from the remote reaction sites are continuously returned for reuse at the respective rinse station.

For example, FIG. 3 could represent a metal fluoroborate plating system with integrated metal recovery and integrated fluoroborate treatment. Work pieces removed from the plating bath 50 are allowed to travel in line through the sequential rinses as shown by the work flow line 51. Fluoroborate plating solution is rinsed from the work in vessel 52 in a recirculated recovery solution 53. This rinse is continuously recirculated to a recovery cell 54 equipped with electrodes 55. Metal ions from the plating bath are electrolytically removed from solution and the effluent from the cell is returned via pump 56 to the rinse with a diminished metal content. In an alternate embodiment for metal recovery not shown, the loop comprising vessel 52 and recovery cell 54 can be omitted, while treatment vessel 58 is equipped with electrodes, thereby achieving simultaneous metal recovery and hydrolysis in said vessel 58. Drag-out from the metal recovery rinse enters the recirculated fluoroborate hydrolysis system via rinse vessel 57. In this loop, the appropriate conditions are maintained for fluoroborate hydrolysis in a remote treatment vessel 58 by means of heat 59, calcium ion addition 60 and pH control 61. The effluent solution 62 from hydrolysis (laden with freed fluoride and hydrofluoric acid) is returned via pump 63 to the rinse vessel 57 where the drag-out mechanism will transfer the freed fluoride and hydrofluoric acid into the recirculated neutralization rinse 64 in rinse tank 65. In the remote treatment vessel 66 pH is adjusted by means of introduction of a base in line 67. Vessel 66 is divided into three separate compartments 67, 68 and 69, in sequential overflow communication with one another. Compartment 67 is equipped with agitator 69 and its function is the same as that of vessel 12 in FIG. 2. Similarly, settling compartment 68 functions as vessel 20 in FIG. 2. Clarified rinse is pumped from compartment 69 by means of pump 70 to rinse vessel 65.

Some precipitation of calcium fluoride may occur in the hydrolysis vessel 58, which for that reason can be compartmentalized into three zones 71, 72 and 73 in the same fashion as shown for vessel 66. The precipitate collected in compartment 72 is transferred via pump 74 and conduit 75 into compartment 67 of vessel 66 for neutralization of entrained acid and final solid-liquid separation in zone 68, provided with outlet 79 for withdrawal of precipitated solids. Vapors from vessel 58 are introduced beneath the liquid surface of vessel 66 through conduit 76. The workpiece is subjected to a water rinse in vessel 77 and spent rinse water is discharged through line 78.

A refinement not shown on FIG. 3 would involve a mechanism for direct solution transfer from the metal recovery rinse system to the fluoroborate hydrolysis center. This would permit a periodic or continuous "blow-down" of the recovery rinse as a control on the fluoroboric acid in this loop. This type of blowdown would be necessary where drag out volumes are insufficient for removal of the acid liberated during electrolytic recovery and build up of free acid could interfere with electrolytic metal recovery.

To demonstrate the interplay of variables (time, temperature, calcium concentration and pH), and to illustrate other potential conditions for this fluoroborate hydrolysis scheme, a series of batch experiments (Examples I through IV) were conducted wherein conditions of temperature, pH and calcium concentration were varied and the rate of fluoroborate hydrolysis was monitored. Equipment was used substantially as shown in FIG. 1 with the exception that the volatiles were condensed and returned to the reactor, thereby preventing loss of fluoride-containing compound from the system. The hydrolysis rates were determined by total fluoride analyses performed on aliquote samples of these test solutions. These samples were taken from treatment systems conducted under the general conditions described by equation (1) and then treated with sodium hydroxide so as to provide a final pH in the range of 8.0 to 9.0. In those cases where the reaction solution contained insufficient calcium for total fluoride precipitation, calcium chloride was added on neutralization to provide at least the stoichiometric amount of calcium requisite for complete precipitation of all potential fluoride contained in the sample. The two reactions, hydrolysis and neutralization, are summarized by the following equation:

$$HBF_4 + 2CaCl_2 + 4NaOH \rightarrow B(OH)_3 + 2CaF_2 + 4NaCl + H_2O \qquad (4)$$

In addition, it should be noted that in the examples to be discussed, where percent hydrolysis of $BF_4^-$ was judged by fluoride removal, all reported results were adjusted for the appropriate, slight calcium fluoride solubility at the reported pH value.

EXAMPLE I

Figure 4:
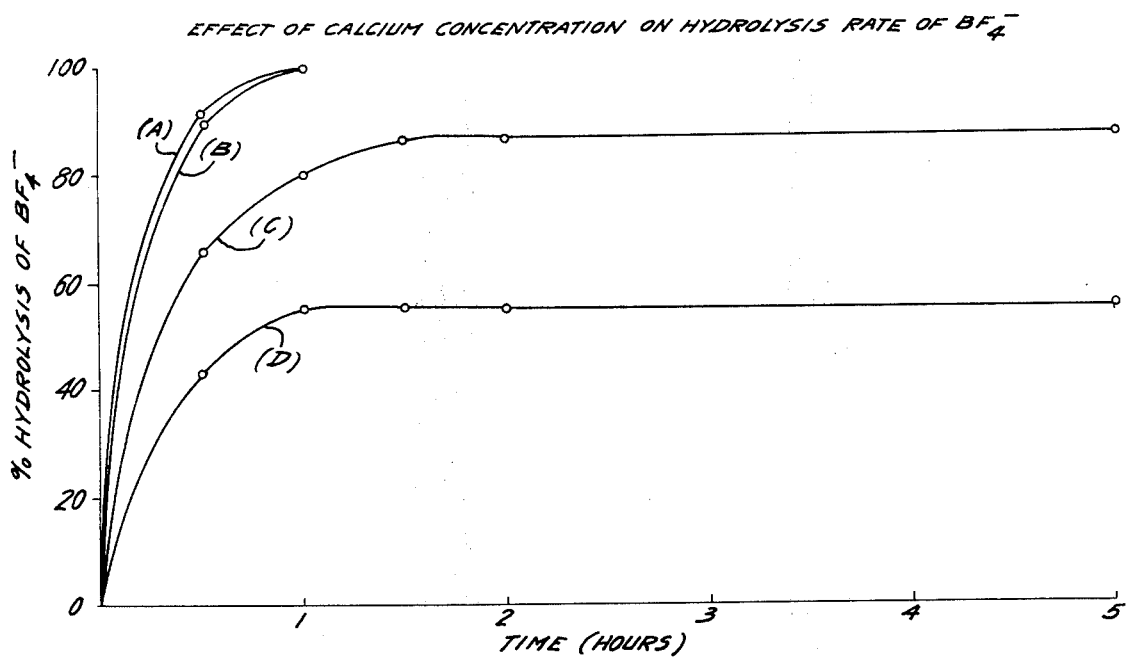
FIGS. 4–7 are graphical representations showing the effects of operating variables on the fluoroborate ion hydrolysis rate.

Four solutions (A through D), each containing 23 m moles of fluoride as fluoroboric acid in 500 ml of deionized water, were placed in separate plastic beakers. Calcium chloride was added to these samples respectively so as to provide a calcium ion concentration of 1.5, 0.5, 0.25 and 0.0 times the potential molar fluoride value available on complete hydrolysis by the fluoroboric acid. All were heated to approximately 180° F and samples were taken periodically for analysis. These samples were treated as described above for adjustment of pH and, where necessary, with calcium addition; then filtered and analyzed for total fluoride. Throughout the test period, the pH of all hydrolysis solutions remained in the range of 1.5 to 2.5; therefore, no additions were necessary to keep this parameter relatively constant. Pertinent data are shown in Table 1 and FIG. 4, which displays the results of this study as percent fluoroborate hydrolysis (removal of potential fluoride values from solution) versus hydrolysis reaction time. This plot illustrates the improvement had on hydrolysis when the reaction is carried out in the presence of calcium ions. Where, at least, the stoichiometric amount of calcium necessary for complete fluoride precipitation was present in the hydrolysis reaction, fluoroborate breakdown was complete in 1 hour or less.

TABLE 1

Effect of Calcium Ion Concentration on % Hydrolysis

| Time - hrs. | Ca ion concentration - PMFV | | | |
|---|---|---|---|---|
| | 0 | 0.25 | 0.5 | 1.5 |
| 0.5 | 43 | 66.5 | 90 | 91 |
| 1.0 | 56 | 80.4 | 100 | 100 |
| 1.5 | 56 | 86.9 | 100 | 100 |
| 2.0 | 56 | 86.9 | 100 | 100 |
| 5.0 | 56 | 86.9 | 100 | 100 |

EXAMPLE II

Figure 6:
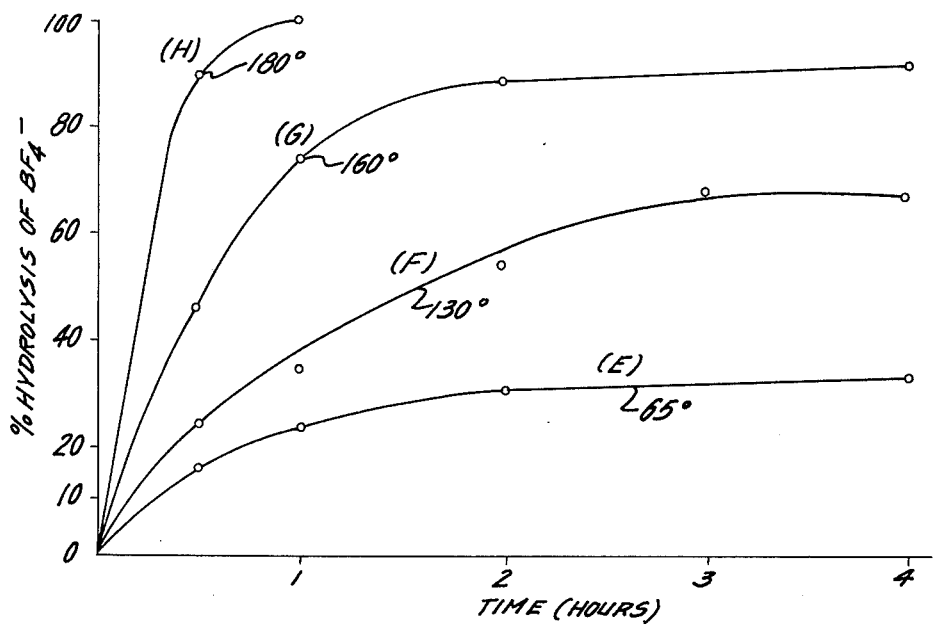

To illustrate dependency of fluoroborate hydrolysis upon reaction temperature, four 500 ml samples (E through H), each containing 23 m moles fluoride as fluoroboric acid and 11.5 m moles of calcium as calcium chloride, were subjected respectively to temperatures of 65°, 130°, 160°, and 180° F. As in Example I, these reactions were periodically sampled, treated and analyzed for total fluoride. Again, the pH of all test solutions remained in the range of 1.5 to 2.5, and no adjustment of this parameter was required. The pertinent data are presented in Table 2 and graphed in FIG. 6. As shown, use of elevated temperatures beneficially affects the hydrolysis rate and complete hydrolysis can be achieved in 1 hour or less when the hydrolysis reaction temperature is maintained at about 180° F.

TABLE 2

Effect of Temperature on % Hydrolysis

| Time - hrs. | Temperature - ° F | | | |
|---|---|---|---|---|
| | 65 | 130 | 160 | 180 |
| 0.5 | 17.9 | 24.3 | 46.1 | 90 |
| 1.0 | 22.0 | 34.8 | 73.9 | 100 |
| 2.0 | 30.5 | 53.9 | 88.7 | 100 |
| 3.0 | — | 67.8 | — | 100 |
| 4.0 | 32.6 | 67.0 | 92.2 | 100 |

EXAMPLE III

Figure 5:
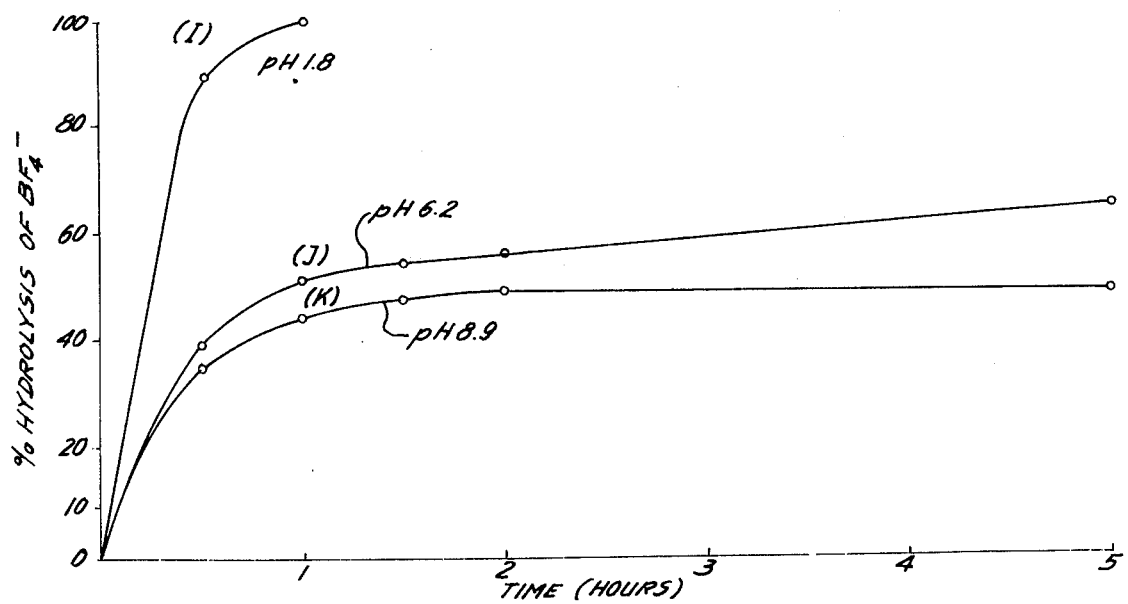

Three solutions (I through K), containing 23 m moles fluoride as fluoroboric acid and 11.5 m moles of calcium (added as calcium chloride) in 500 ml of deionized water, were heated and maintained at a temperature near 180° F. During this process, the pH of solutions I, J, and K were maintained respectively at the approximate pH's of 1.8, 6.2 and 8.9 by appropriate additions of sodium hydroxide. As in Examples I and II, periodic samples were taken from these reactions and, where necessary, adjusted to a pH of about 8.0 to 9.0. Subsequently, these samples were filtered and analyzed for total fluoride. Results of this reaction series are shown in Table 3 and represented in FIG. 5. As shown, maintenance of acid conditions promotes the hydrolysis reaction and rapid rates are obtained in the acidic pH range.

TABLE 3

| Time - hrs. | Effect of pH on % Hydrolysis | | |
|---|---|---|---|
| | 1.8 | ph 6.2 | 8.9 |
| 0.5 | 90 | 39 | 35 |
| 1.0 | 100 | 51.4 | 44 |
| 1.5 | 100 | 54 | 48 |
| 2 | 100 | 57 | 49 |
| 5 | 100 | 66 | 50 |

EXAMPLE IV

Figure 7:
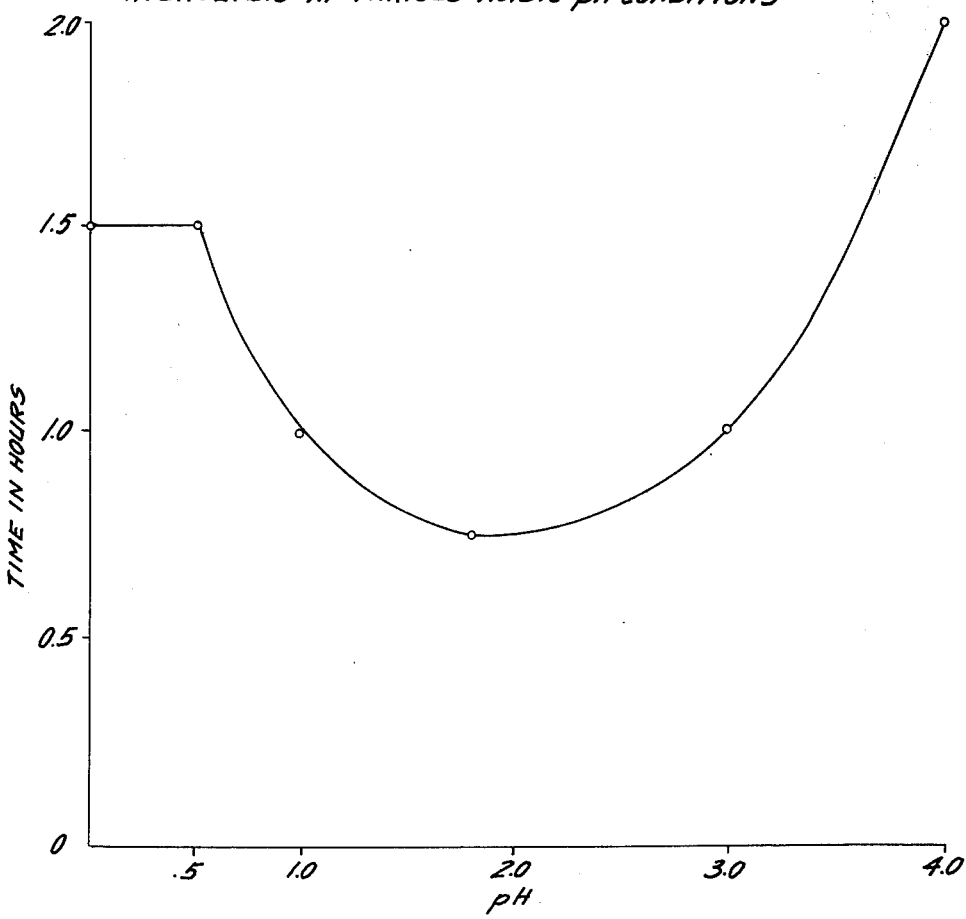

To further define the optimum pH conditions for fluoroborate destruction, another series of experiments was conducted according to the conditions and procedures described in Example III. However, in this series, individual test solutions were maintained at pH values of approximately 0, 0.5, 1.0, 3.0, and 4.0 and the time to achieve complete fluoroborate hydrolysis was again judged by total fluoride analysis performed on aliquote samples of test solutions. Results of this study are shown in Table 4 and are also displayed in FIG. 7 as a plot of time required for complete fluoroborate hydrolysis versus pH of the reaction solution. The hydrolysis time shown on FIG. 7 for pH equal 1.8 was estimated from the test described in Experiment III, and all values shown are somewhat approximate as analyses were performed at thirty-minute intervals - the desired hydrolysis reaction most likely was complete in a shorter time period than shown in FIG. 7. However, these data serve to illustrate that fluoroborate decomposition proceeds very rapidly in the preferred pH range.

TABLE 4

Effect of pH on Time for Complete Hydrolysis

| pH | Time - hrs |
|---|---|
| 0 | 1.5 |
| 0.5 | 1.5 |
| 1.0 | 1.0 |
| 3.0 | 1.0 |

TABLE 4-continued

Effect of pH on Time for Complete Hydrolysis

| pH | Time - hrs |
|---|---|
| 4.0 | 2.0 |

EXAMPLE V

To demonstrate the fluoroborate treatment method of this invention in other than a batch system, a laboratory-scale continuous flow-through treatment was set up to approximate the scheme shown in FIG. 2, as exception being that in the laboratory system, the hydrolysis tank was capped and vented into the neutralization tank. The waste stream feed to the hydrolysis tank was prepared from a standard tin fluoroborate plating bath by diluting to 10% of normal concentration with deionized water. This solution contained approximately 32.5 g/l $Sn(BF_4)_2$, 10.5 g/l $HBF_4$, and small quantities of various organic additives usually found in this type of plating bath for improvement of the deposit and to stabilize the solution. Before the solution was fed into the treatment system, it was passed through an electrolytic recovery cell where the tin content of the solution was lowered to approximately 2.0 g/l. The overflow from the recovery cell was directed into a three-liter hydrolysis tank where it was heated to 180° F–200° F and agitated in the presence of calcium ions at a pH in the range of 1.5 to 2.0 for a period of 1.5 to 3.0 hours, depending upon the rate of continuous addition of feed solution. Calcium ions were provided at 1.0 PMFV by addition of calcium chloride solution (615–620 g/l $CaCl_2 \cdot 2H_2O$) and calcium oxide as necessary to hold the hydrolysis solution in the desired pH range. The overflow from hydrolysis passed into a pH adjustment vessel where the pH was maintained between 8.0 and 10.5 by addition of lime slurry having a concentration of 20 g/l. Effluent from the pH adjustment tank flowed into a final container where the precipitated calcium fluoride and tin hydroxide were allowed to settle. The effluent from this step was periodically monitored for total fluoride and tin content and it was found that the total fluoride in the effluent was consistently in the range of 300 to 350 mg/l, and that the tin levels in same were on the order of 1 to 2 mg/l. Total fluoride analysis on the effluent indicated a 98 to 99 percent hydrolysis of the fluoroborate contained in the feed solution accounting for the dilution due to addition of calcium chloride solution and lime slurry. Presence of the residual fluoride in the effluent was attributed to unavoidable breakthrough or "short-circuiting" that can occur in such a small-volume, high-load system.

What is claimed is:

1. A process for removal of fluoride values from a solution containing fluoroborate compounds which comprises:
   hydrolyzing said solution at an acid pH of about 4 or less and at an elevated temperature of at least 130° F in the presence of calcium ions to liberate fluoride values, wherein the total amount of said calcium ions is sufficient to provide at least 0.25 times the potential molar fluoride value of the solution, and removing said liberated fluoride values from solution.

2. The process of claim 1, wherein the acid pH is maintained at a value in the range of about 1 to about 3.

3. The process of claim 1, wherein the temperature is at least about 160° F.

4. The process of claim 1, wherein the temperature is between about 180° F and about 200° F.

5. The process of claim 1 wherein during the hydrolysis the amount of calcium ions is sufficient to provide at least 0.5 times the potential molar fluoride value of the solution.

6. The process of claim 5, wherein the liberated fluoride values are removed from the solution by addition of an alkaline compound selected from a hydroxide, oxide or carbonate of an alkali of alkaline earth metal compound to provide a pH in the range from about 8.0 to about 11.0, to neutralize free acid and to precipitate calcium fluoride.

7. The process of claim 6, wherein the alkaline compound is sodium hydroxide.

8. The process of claim 6, wherein the alkaline compound is calcium hydroxide.

9. The process of claim 1 wherein during the hydrolysis the calcium ion concentration is maintained at a value in excess of soluble calcium fluoride present in the solution.

10. The process according to claim 5 wherein sufficient quantities of hydrochloric acid and calcium hydroxide are added to the solution to maintain the pH thereof at a value of 4.0 or less and to provide said calcium ions.

* * * * *